Oct. 6, 1936.  H. S. McLAREN  2,056,684
ROTARY VALVE INTERNAL COMBUSTION ENGINE
Filed July 18, 1932  3 Sheets-Sheet 1

INVENTOR
H. S. McLAREN
ATTY.

Oct. 6, 1936. H. S. McLAREN 2,056,684
ROTARY VALVE INTERNAL COMBUSTION ENGINE
Filed July 18, 1932 3 Sheets-Sheet 2
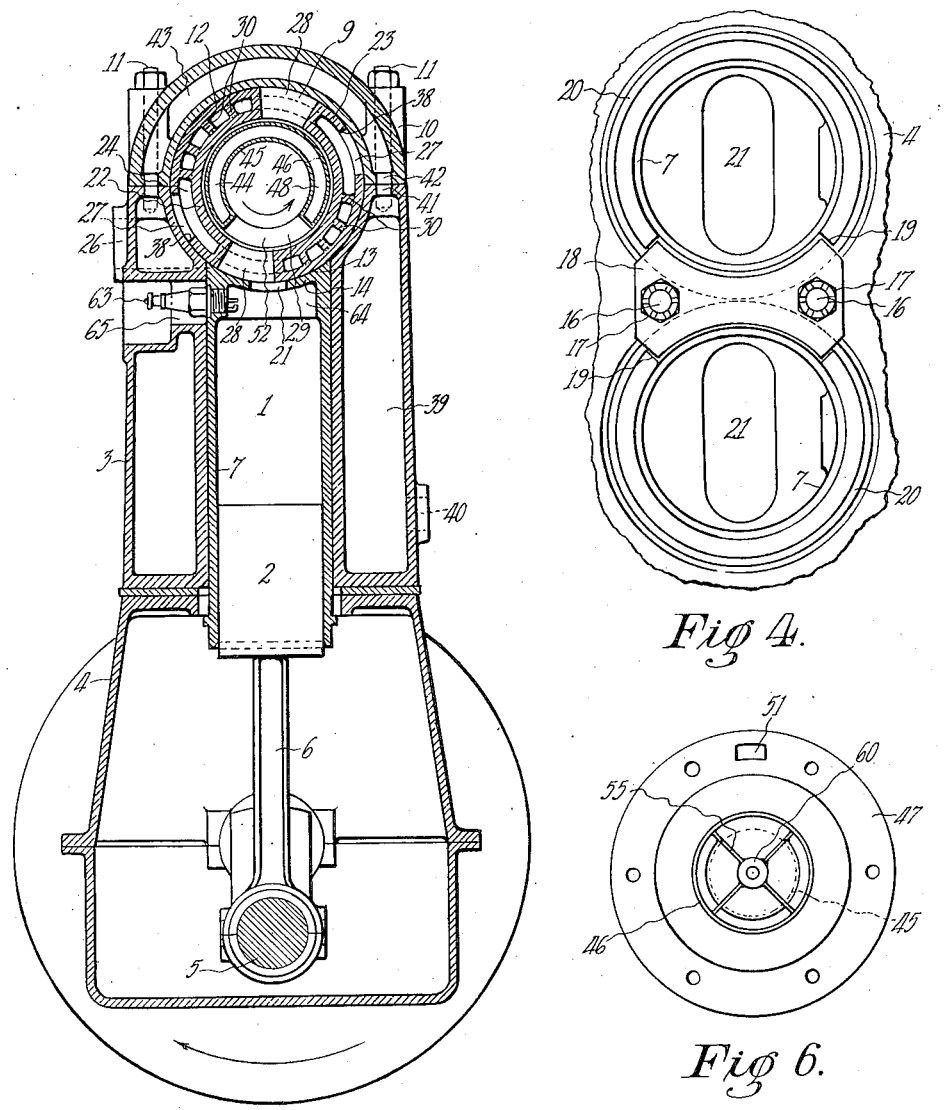
Fig 2.
Fig 4.
Fig 6.
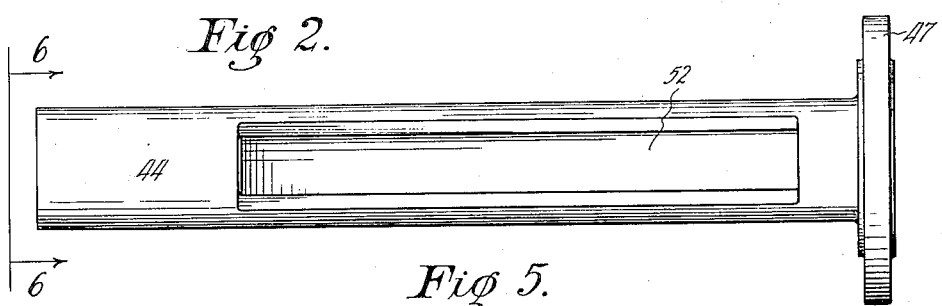
Fig 5.
INVENTOR
H. S. McLAREN Oct. 6, 1936.  H. S. McLAREN  2,056,684
ROTARY VALVE INTERNAL COMBUSTION ENGINE
Filed July 18, 1932  3 Sheets-Sheet 3

INVENTOR
H. S. McLAREN

Patented Oct. 6, 1936

2,056,684

UNITED STATES PATENT OFFICE 2,056,684

ROTARY VALVE INTERNAL COMBUSTION ENGINE

Hugh Stanley McLaren, North Brighton, Victoria, Australia

Application July 18, 1932, Serial No. 623,267
In Australia July 31, 1931

2 Claims. (Cl. 123—59)

This invention relates to an improved internal combustion engine in which a rotary valvular member is used to control the admission of explosive mixture to a cylinder or cylinders and the discharge of the products of combustion therefrom.

Internal combustion engines having rotating valves have been constructed previously, but they had disadvantages in that the valves were insufficiently cooled and were apt to overheat and lose their lubrication. In consequence they became unduly worn and scored after short periods of use and not infrequently seized on their seatings. Moreover, in previously proposed engines the valves were unbalanced and rotated at relatively high speed and, as such engines were devoid of means for maintaining close contact of the valves with their seatings, leakage of ignited mixture at high pressure occurred and rapidly eroded and burnt away the edges of the valve ports or openings. Furthermore, in prior engines having rotary valves insufficient attention was given to the matter of lubrication and generally the oil that worked its way past the pistons from the crankcases of such engines was solely relied upon to lubricate the rotary valves.

In the present invention the above mentioned disadvantages are obviated. The rotary valvular member is balanced and operates at comparatively slow speed and it is effectively cooled externally and internally.

Moreover, means are provided to maintain close contact of the valvular member and its seating whereby loss of compression and leakage at high pressure are eliminated. Furthermore, the inlet and outlet passages in the valvular member are of relatively large sectional area, and the former provide unobstructed entry for the ingoing explosive charge with corresponding gain of volumetric efficiency, while the latter provide free exit for the exhaust gases with resultant reduction of back pressure.

In this invention, the rotary valvular member extends across the cylinder head or heads and in the case of a multi-cylinder engine is parallel with the longitudinal axis, and although the said member may rotate at half the speed of the engine crankshaft it preferably revolves at one quarter crankshaft speed. In order that the valvular member may function at one quarter crankshaft speed, two inlet and two exhaust ports are provided for each cylinder, and as the respective ports are disposed in diametrically opposed positions the valvular member may be accurately balanced. In some cases it may be necessary or desirable for the rotary valvular member to rotate at even lower speeds, and it may revolve at one-sixth or one-eighth crankshaft speed. In such cases the rotary valvular member has three inlet and three exhaust ports when its speed is one-sixth that of the crankshaft, and said member has four of each of said ports when it revolves at one-eighth crankshaft speed.

The valvular member rotates in a water-jacketed chamber and is provided with an axial exhaust chamber in which is concentrically mounted a tubular water jacket which protects the interior of the valvular member from the heating action of the exhaust gases. An annular chamber is formed in the valvular member concentrically about the axial exhaust chamber and is at all times associated with the explosive mixture supply, and ports in the periphery of said member connect the cylinders in proper sequence with the annular chamber. Exhaust passages extend radially across the annular chamber and connect the cylinders in required succession with the axial exhaust chamber which forms an exhaust outlet of large sectional area.

A feature of the invention resides in the provision of means whereby the seatings of the rotary valvular member are rendered movable and are resiliently maintained in contact with the periphery of said member. For this purpose the cylinders are fitted with slidable sleeves or liners having segmental seatings formed to closely fit upon the periphery of the valvular member, and springs or like resilient means are adapted to exert pressure upon the sleeves or liners to maintain the same in contact with the valvular member. Each sleeve or liner may be forced by springs against the valvular member independently of the others, or separate sleeves or liners may be urged by springs towards the valvular member in pairs or in larger groups. Again, all the sleeves or liners may be formed integrally as by casting and they may be impelled by springs as a unit into contact with the valvular member.

The invention also provides means for lubricating the rotary valvular member positively and continuously so that said member is at all times efficiently lubricated. Lubrication of the valvular member is also effected by the suction of the pistons on their induction strokes, which causes small quantities of oil to be drawn from the crankcase between the slidable sleeves and their guides and on to the valvular member. Moreover, the motion of the pistons on their induction strokes relieves the resilient pressure of the springs on the sleeves or liners and momentarily breaks the contact of the segmental seatings with the valvular member, thereby permitting oil to be suctionally drawn in between said seatings and member.

In order that the invention may be better understood, embodiments of the same will now be described with reference to the accompanying drawings wherein:—

Fig. 2 is a transverse section on the line 2—2 in Fig. 1.

Fig. 4 is a fragmentary inverted plan of a detail of the invention.

Fig. 5 is an inverted plan of a further detail.

Fig. 6 is an end elevation on the line 6—6 in Fig. 5.

Figure 1:
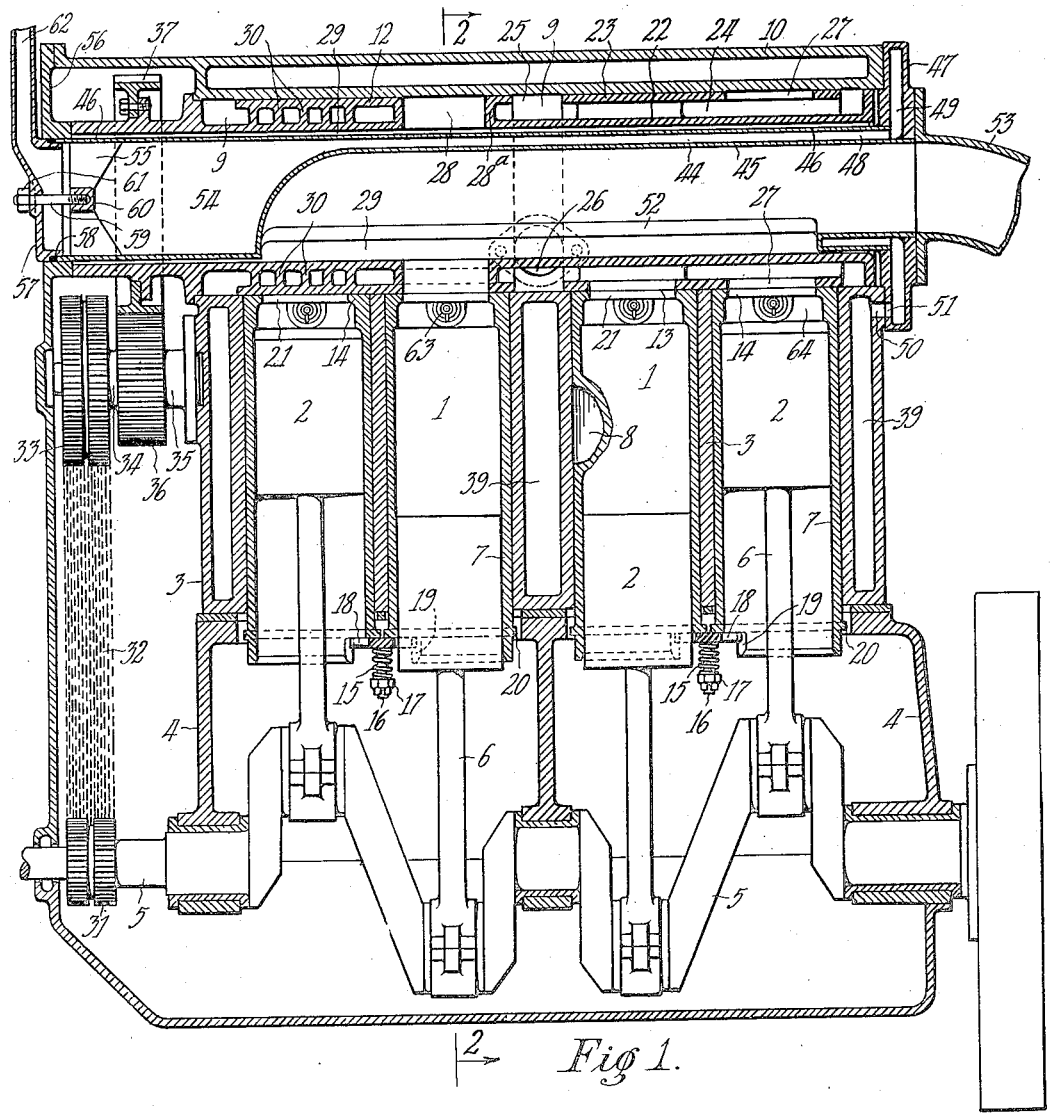
Fig. 1 is a view in longitudinal section of an internal combustion engine according to the invention.

In these drawings 1 indicates the cylinders, 2 the pistons, 3 the cylinder block or casting, 4 the crankcase, 5 the crankshaft, and 6 the connecting rods of an internal combustion engine. The cylinders 1 form the interiors of movable sleeves or liners 7, the peripheries of which are accurately machined to slidably fit within parallel bored cylindrical guides 8 in the cylinder block or casting 3.

A cylindrical chamber or valve chamber 9 is arranged above the cylinders 1, and may be formed integrally with the cylinder casting 3, but is preferably made partly in the cylinder casting and partly within a detachable cover 10 secured to said casting by bolts 11.

Rotatably fitting the valve chamber 9 is a cylindrical valvular member or valve sleeve 12, against the peripheral surface of which contact accurately machined segmental circular seatings 13, see Fig. 2, made on closures 14 forming the upper ends of the sleeves or liners 7. The segmental seatings 13 are resiliently maintained in close contact with the valve sleeve 12 by springs 15 mounted on studs 16 screwed into the crankcase 4.

The springs 15 at their lower ends abut upon adjustable nuts 17 on the studs 16 and at their upper ends bear upon pressure plates 18, which contact with the lower ends of the sleeves 7 and thrust the same upwardly into contact with the valve sleeve 12. To accommodate the pressure plates 18, the sleeves 7 are cut away as indicated at 19, see Fig. 4, and are further provided with peripheral collars 20 to provide increased contact area for said plates. In the segmental seatings 13 and extending through the closures 14 of the sleeves 7 are formed openings or ports 21, through which explosive mixture passes into the cylinders 1 and exhaust gases are discharged from the same in the manner hereinafter described.

Figure 8:
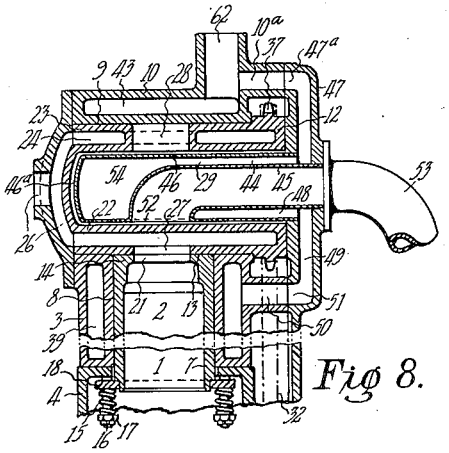
Fig. 8 is a longitudinal section showing portions of a single cylinder engine embodying the invention.
Figure 10:
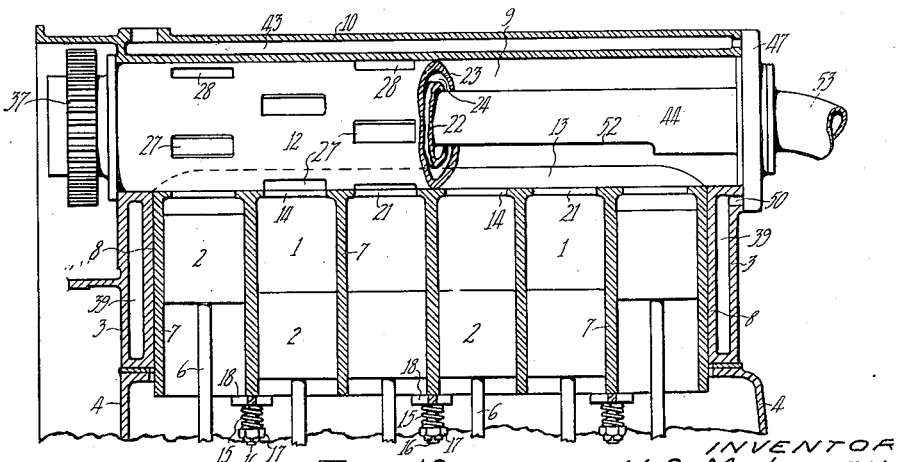
Fig. 10 is a longitudinal section of a cylinder block having integrally formed slidable cylinders.

The sleeves or liners 7 may be made separately and they may be thrust into contact with the valve sleeve 12 singly (as shown in Fig. 8) or in pairs as illustrated in Fig. 1, or in groups of greater number. Alternatively, the sleeves or liners 7 may be formed integrally together by casting, see Fig. 10, and such united sleeves or liners may be maintained as a unit in contact with the valve sleeve 10 by springs 15 and pressure plates 18. When the sleeves or liners 7 are made as one cast unit, the guide 8 in the cylinder block 1 is shaped to correspond with said integral sleeves or liners and is adapted to slidably accommodate the same.

It will be understood that the collars 20 on the sleeves or liners 7 may be dispensed with in order to permit said sleeves or liners to be withdrawn upwardly from the guides 8 after the cover 10 and valve sleeve 12 have been removed.

The valve sleeve 12 is preferably made by casting and is provided with inner and outer concentric walls, which are indicated respectively by 22 and 23. The space between the walls 22 and 23 forms an annular chamber 24 that extends for a sufficient distance along the valve sleeve 12 to be positioned above all the cylinders 1.

The annular chamber 24 is at all times associated with the explosive mixture supply. For this purpose the outer wall 23 is provided with a peripheral slot 25, which extends around the entire circumference of the valve sleeve 12 and is located in alignment with an inlet passage 26 that is formed in the cylinder casting 3 and is connected with a carburetter (not shown) or other source of explosive mixture. The valve sleeve 12 shown in Figs. 1 and 3 has a centrally disposed inlet slot 25, but it is to be understood that the slot 25 and inlet passage 26 may be otherwise located and that two or more of such slots aligned with correspondingly positioned inlet passages 26 may be provided, if necessary, to ensure equality of mixture supply to all the cylinders 1.

Figure 7:
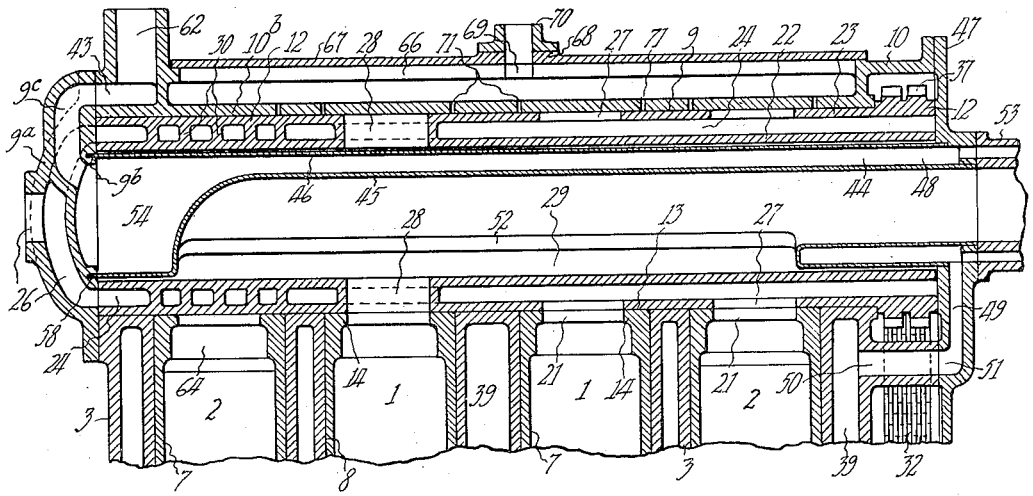
Fig. 7 is a longitudinal section showing a modified valvular member and further details of the invention.

In Figs. 7 and 8 it will be seen that the peripheral slot or slots 25 in the valve sleeve 12 are dispensed with, and that the inlet passage 26 is positioned centrally at one end of the valve chamber 9 and is formed in a cover 9ª fixed on said chamber 9. The annular chamber 24 is open at the end adjoining the passage 26 and is at all times associated with said passage.

A pair of oppositely disposed slots or inlet ports 27 is formed in the outer wall 23 of the annular chamber 24, and positioned across the annular chamber between the outer and inner peripheries of the valve sleeve 12 are oppositely disposed passages or exhaust ports 28 formed within partitioning walls 28ª which extend radially across the annular chamber 24. The exhaust ports 28 terminate at their inner ends in the interior of said sleeve which forms an exhaust chamber 29 for discharge of the products of combustion. The portions of the annular chamber 24 between the inlet ports 27 and exhaust ports 28 are reinforced by integrally formed bridging pieces or struts or ribs 30 for a purpose hereinafter described.

The valve sleeve 12 is driven from the crankshaft 5 by suitable gearing, which in the engine illustrated comprises a sprocket 31 fixed to the crankshaft 5 and operatively connected by a chain 32 to a sprocket 33 on a sleeve 34 rotatably mounted on a stub shaft 35 and carrying a gear 36 in mesh with a gear 37 fixed to the valve sleeve 12. It will be understood that other driving means may be employed to operatively connect the crankshaft 5 with the valve sleeve 12. When the chain 32, sprockets 31 and 33, and gears 36 and 37 are used, the valve sleeve 12 rotates oppositely to the crankshaft 5 as indicated by arrows in Fig. 2. However, other forms of gearing may be employed to drive the crankshaft 5 and valve sleeve 12 in the same direction, if required.

Attention being directed more particularly to Fig. 2 it will be observed that as the valve sleeve 12 rotates, the inlet ports 27 and exhaust ports 28 pass alternatively over the port 21 and connect the cylinder 1 with the annular chamber 24, peripheral slot 25 and inlet passage 26 and thereby with the source of explosive mixture. Moreover, as the valve sleeve 12 rotates the exhaust ports 28 in passing over the port 21 connect the cylinder 1 with the interior of the valve sleeve or exhaust chamber 29.

Figure 3:
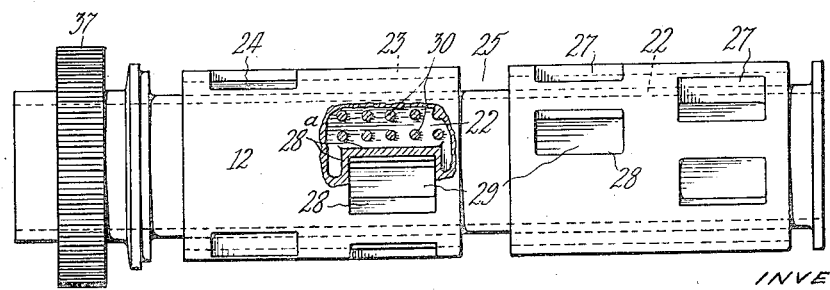
Fig. 3 is a view in plan of the rotary valvular member.

Each reinforced or strutted portion of the outer wall 23 and the inlet port 27 and exhaust port 28 on its opposite sides form a control section of the valve sleeve 12 corresponding with one complete cycle of the piston 2 which, as usual, is performed in two revolutions of the crankshaft 5. As the leading edge, indicated by 38, of each inlet port 27 opens the port 21 (see Fig. 2) the piston 2 commences a working cycle, so that two working cycles corresponding to four revolutions of the crankshaft 5 are performed during each revolution of the valve sleeve 12. Accordingly, the valve sleeve 12 may rotate at only one quarter of the speed of the crankshaft 5, and the driving means operatively connecting the former with the latter (namely the chain 32 sprockets 31 and 33 and the gears 36 and 37) are designed to give a four to one reduction of speed. Similar inlet ports 27 and exhaust ports 28 are formed for each of the cylinders 1 in appropriate positions in the valve sleeve 12, as shown in Fig. 3. It will be observed that the inlet ports 27, exhaust ports 28 and the strutted portions of the valve sleeve 12 are arranged in diametrically opposite pairs whereby said sleeve may be dynamically balanced without difficulty.

Figure 9:
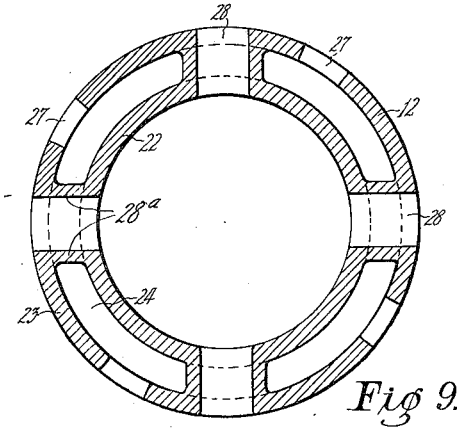
Fig. 9 is a transverse section of a modified valvular member.

In some cases in which it is desirable that the valve sleeve 12 should rotate more slowly, three inlet ports 27 and three exhaust ports 28 may be provided and the gearing operatively connecting the valve sleeve 12 with the crankshaft 5 may be designed to drive said sleeve at one sixth crankshaft speed. The valve sleeve 12 may be run even more slowly and it may be provided with four inlet ports 27 and four exhaust ports 28, see Fig. 9, and the gearing connecting said sleeve with the crankshaft 5 may be designed to rotate said sleeve at one eighth of the speed of the crankshaft 5.

In Fig. 1, the pistons 2 are shown in positions corresponding to the commencement of one complete cycle of the engine, the piston 2 at the left hand end of the engine occupying the firing or igniting position at the commencement of its working stroke. In this position of the piston 2, the port 21 is closed by the reinforced or strutted portion of the valve sleeve 12, which is thereby enabled to resist without distortion the increased upward thrust of the sleeve 7 occurring at the moment of ignition. The adjoining piston 2 is about to commence its exhaust stroke and expel the residual products of combustion through the port 21 and exhaust port 28 into the exhaust chamber 29. The next adjoining piston 2 is about to commence its compression stroke, the inlet port 27 being still open but approaching its closing position. The piston 2 at the right hand end of the engine is starting on its suction stroke, the port 21 and the inlet port 27 being open and connecting the corresponding cylinder 1 with the annular chamber 24.

In order to maintain the temperature of the valve sleeve 12 within moderate limits, it is provided with cooling means both externally and internally. The cylinder casting 3 is provided with the usual cooling water space 39, which also surrounds the lower half of the valve chamber 9. Water enters through an inlet 40—see Fig. 2—into the space 39, rises therein and passes through aligned holes 41 and 42 into a water jacket 43, which is formed in the cover 10 and surrounds the upper half of the valve chamber 9. Accordingly, the valve chamber 9 is surrounded to a large extent by water so that the outer wall 23 of the valve sleeve 12 is kept cool and the lubrication of its periphery is efficiently maintained.

The inner wall of the valve sleeve 12 is protected from the highly heated exhaust gases by a tubular cooling jacket 44, which is fixed longitudinally in the interior of the valve sleeve 12 forming the exhaust chamber 29. This cooling jacket extends from end to end of said sleeve and is positioned closely to the inner periphery of the wall 22, but it does not contact therewith.

The cooling jacket 44 is preferably made of thin sheet metal, and the portion of the same extending above the cylinders 1 comprises inner and outer tubes 45 and 46. The tubes 45 and 46 are integrally united as by autogenous welding with the opposite sides of a header 47, see Fig. 1, the annular space 48 between said tubes being thereby associated with the interior 49 of the header which by means of aligned apertures 50 and 51 is connected with the water space 39. Accordingly, water is free to pass from the water space 39 through the apertures 50 and 51 into the header 47 and thence into the cooling jacket 44.

The portion of the cooling jacket 44 positioned immediately above the sleeve ports 21 is provided with a longitudinal slotted opening 52—see Fig. 5—and the exhaust gases, in escaping, pass through the exhaust ports 28 into the chamber 29, through the opening 52 into the tube 45 and thence to the exhaust pipe 53.

The part of the cooling jacket 44 located remotely from the header 47 is formed as an extension of the tube 46 and comprises a water chamber 54. The end of the water chamber 54 may be closed in several ways, and in Figs. 1 and 6 is shown a spider 55 which is united as by autogenous welding with the tube 46, the end of which is fitted in a cover plate 56. A plate 57 forming a closure of the water chamber 54 also fits within the cover plate 56, and between the closure 57 and the end of the tube 46 suitable packing 58 is inserted. A stud 59 screwed into the central boss 60 of the spider 55 extends through the closure 57 and is provided with a nut 61 whereby said closure is maintained in position and is tightened upon the packing 58. A tubular outlet 62 formed as an extension of the closure 57 conducts heated water from the chamber 54 to a radiator or other cooling means. Alternatively as seen in Fig. 7, the tube 46 fits an annular groove 9$^b$ in the cover 9$^a$, and packing 58 is inserted between the end of said tube and the bottom of said groove. In this arrangement a passage 9$^c$ is formed in the cover 9$^a$ and is connected with the outlet 62 which may be formed on the detachable cover 10 of the valve chamber 9. When an engine is provided with one cylinder only, see Fig. 8, the water chamber 54 is closed by a plate 46$^a$ integrally united with the tube 46, and a passage 47$^a$ is formed in the header 47 and is connected by a passage 10ª with the water outlet 62.

To ignite the explosive mixture compressed by the pistons 2 in the cylinder sleeves 7, spark plugs 63 or other ignition devices may be provided in the combustion chambers 64 at the inner ends of said sleeves. Elongated apertures 65—see Fig. 2—are formed in the cylinder casting 3 to permit the spark plugs 63 to be screwed into the sleeves 7 and to provide clearances to permit slidable movement of said sleeves.

In order to positively lubricate the valve sleeve 12, a longitudinal groove 66 is formed in the detachable cover 10, see Fig. 7, and is closed by a plate 67 having a seating 68 in which is formed an orifice 69. A pipe flange 70 is fixed to the seating 68 and is connected by tubing (not shown) with the usual lubricating pump of the engine. Oil delivered by the pump passes through the orifice 69 into the groove 66 and thence through holes 71 in the inner wall 10ᵇ of the detachable cover 10 to lubricate the rotary valve sleeve 12. As the valve sleeve 12 is maintained in close contact with the inner wall 10ᵇ by the upward thrust of the springs 15 on the sleeves or liners 7, only sufficient oil passes from the holes 71 to maintain an oil film between the periphery of said sleeve and said inner wall.

The rotary valve sleeve 12 being mechanically balanced is silent in operation and it is efficiently cooled externally by the water circulating through the water space 39 and jacket 43, and cooled internally by water passing through the cooling jacket 44 and also by the cooling effect of the incoming mixture so that the lubrication of said sleeve is effectively maintained. Moreover, the valve sleeve 12 provides a free exhaust, and the efficient cooling in conjunction with the comparatively slow speed of said sleeve prevents wear of its periphery and obviates seizing. Furthermore, as the sleeves 7 during the compression and power strokes of the piston 2 are maintained closely in contact with the valve sleeve 12 by the increased gaseous pressure upon the closures 14, leakage of the explosive charge and of the highly heated ignited mixture from the ports 21 is obviated in effective manner.

The invention has been herein described with special reference to a four-cylinder engine, but it may be applied with like advantages to engines having a less or greater number of cylinders than four. Such changes and alterations in minor details and in design may, however, be made within the ambit of the invention as defined by the appended claiming clauses.

What I do claim is:—

1. An internal combustion engine having a rotary valvular member embodying a central longitudinal exhaust chamber opening through the member at one end, an exhaust pipe leading from the open end of said exhaust chamber, said valvular member being formed with an induction chamber concentric with the exhaust chamber and in constant communication with a supply of explosive mixture, the induction chamber being formed with openings serving as inlet ports, said valvular member having passages extending through and closed against the induction chamber and opening into the exhaust chamber to serve as exhaust ports, a water jacket disposed about the periphery of the induction chamber, an internal cooling jacket in the exhaust chamber, said cooling jacket having spaced inner and outer walls, with the inner wall defining the exhaust passage in the valvular member, said cooling jacket being formed with a longitudinal opening to establish communication between the exhaust passage and the exhaust ports, a detachable closure at one end of the cooling jacket and having a water outlet, and a header at the opposite end of the cooling jacket concentric with said jacket immediately adjacent the connection of the exhaust pipe thereto, said header being in open communication with the cooling system of the engine and with the cooling jacket, the inner wall of the cooling jacket extending through the header with the adjacent end of the exhaust pipe bearing against the outer wall of the header.

2. An internal combustion engine as claimed in claim 1, wherein the internal tubular water jacket extends throughout the rotary valve, and a water supply header and a detachable closure plate are mounted adjacently to opposite ends of the rotary valve, and wherein the internal tubular water jacket is supported at one end by the water supply header and at the opposite end by the detachable closure plate.

HUGH STANLEY McLAREN.